United States Patent [19]

Pizzi

[11] Patent Number: 5,714,867
[45] Date of Patent: Feb. 3, 1998

[54] TERMINATION AT PRESET VOLTAGE LEVEL

[75] Inventor: Raymond J. Pizzi, Brick, N.J.

[73] Assignee: The United States of America as represented by the Secretary of the Army, Washington, D.C.

[21] Appl. No.: 697,046

[22] Filed: Aug. 19, 1996

[51] Int. Cl.⁶ ............................................. H01M 10/46
[52] U.S. Cl. ......................................... 320/6; 320/13
[58] Field of Search ........................ 320/6, 7, 13, 15, 320/16, 17, 39, 40, 51, 45, 18, 14

[56] References Cited

U.S. PATENT DOCUMENTS

| | | | |
|---|---|---|---|
| 4,146,829 | 3/1979 | Rinaldi | 320/13 |
| 4,713,597 | 12/1987 | Altmejd | 320/18 X |
| 4,719,401 | 1/1988 | Altmejd | 320/13 |
| 4,864,092 | 9/1989 | Obara | 219/69.18 |
| 5,063,340 | 11/1991 | Kalenowsky | 320/18 X |

*Primary Examiner*—Edward Tso
*Attorney, Agent, or Firm*—Michael Zelenka; John M. O'Meara

[57] ABSTRACT

A circuit is provided for discharging electric charge storing devices. Diodes arranged in series are disposed in this circuit to preset the voltage level at which discharge from each charge storing device is terminated. Each diode arrangement includes one or more diodes and the combined conductive voltage drop thereacross presets the terminating voltage level for the charge storing device that relates thereto. In one preferred embodiment of the circuit, a voltage regulator is combined with a charge dissipating resistance to pass a uniformly constant charge flow rate from the charge storing devices.

13 Claims, 2 Drawing Sheets

5,714,867

TERMINATION AT PRESET VOLTAGE LEVEL

GOVERNMENT INTEREST

The invention described herein may be manufactured, used, imported, sold and licensed by or for the Government of the United States of America without the payment to me of any royalty thereon.

BACKGROUND OF THE INVENTION

This invention relates to a circuit for discharging electric charge storing devices, and more particularly one which terminates the discharge of each charge storing device when the voltage level thereacross decreases to a preset level.

When various types of batteries are repeatedly recharged, weak cells may develop therein to cause a reversible loss in the charge storage capacity thereof. This loss can be substantially nullified prior to recharging by discharging such batteries to drop the voltage thereacross below the normal operating level thereof. To further enhance such battery restoration, a uniformly constant current discharge should be utilized. Presently however, commercially available battery recharging equipment utilizes circuitry of unnecessary complexity for presetting the voltage levels to which the batteries are discharged. Furthermore, such equipment implements the constant current discharge by switching through a sequence of load dissipating resistors as battery output voltage decreases. With this equipment therefore, the current discharge is not uniformly constant because a stepped sequence of unequal current levels are derived therewith.

SUMMARY OF THE INVENTION

It is the general object of the present invention to incorporate diodes into a discharge circuit for terminating the discharge of electric charge storing devices when the voltage thereacross drops to predetermined levels.

It is a specific object of the present invention to draw a uniformly constant current from charge storing devices with the discharge circuit of the general object.

These and other objects of the present invention are accomplished by passing current discharged from the charge storing devices through a load, with the current contribution of each device being directed to the load through a series arrangement of at least one diode that functions to preset the voltage level at which discharge from that device will terminate. If desired, a uniformly constant charge flow rate from the charge storage devices is maintained with a voltage regulator that applies a constant current to a charge dissipating resistance. Any type of diodes may be utilized in the invention, while a negative feedback arrangement is incorporated to serve as the voltage regulator in a particular embodiment of the invention.

The scope of the present invention is only limited by the appended claims for which support is predicated on the preferred embodiments set forth hereafter in the following description and the attached drawings wherein like reference characters relate to like parts throughout the figures thereof.

DESCRIPTION OF THE PREFERRED EMBODIMENTS

Figure 1:
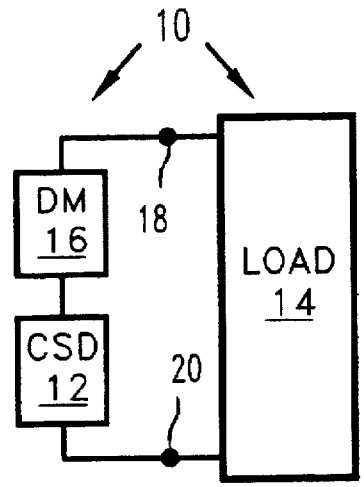
FIG. 1 is a block diagram for the discharge circuit of the invention.

A circuit 10 for discharging at least one electric charge storing device 12 (hereinafter CSD 12) in accordance with the invention, is illustrated in the block diagram of FIG. 1. The single CSD 12 shown in FIG. 1 connects to but is not a part of circuit 10 which only includes a load 14 for dissipating electric charge and a diode means 16 (hereinafter DM 16) for terminating the flow of electric charge from each CSD 12. An input having positive and negative terminals 18 and 20 respectively, is disposed on the load 14, with one end of each DM 16 being connected to one of the terminals 18 or 20, so as to pass electric charge therethrough when the CSD 12 relating thereto is interconnected between that DM 16 and the other terminal 20 or 18.

Figure 2:
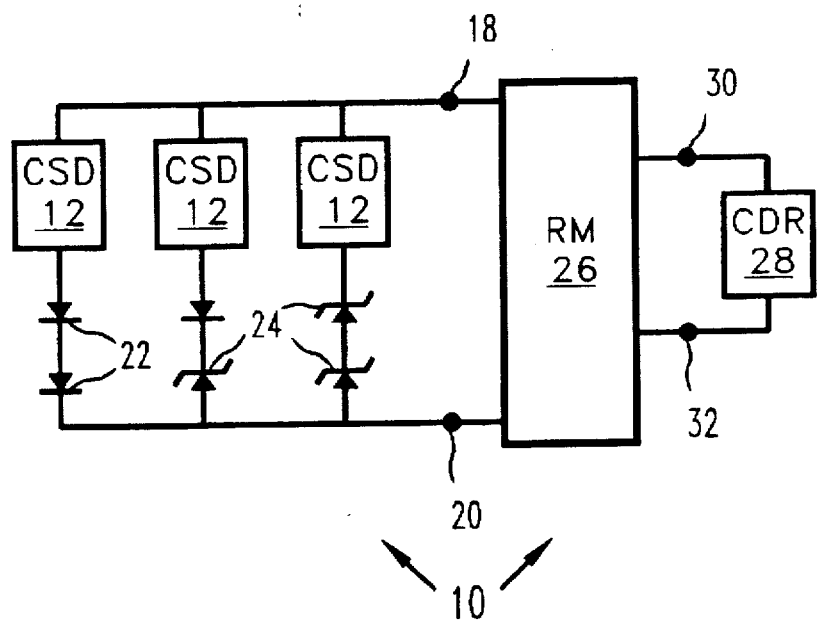
FIG. 2 is a schematic/block diagram for an embodiment of the invention which maintains a uniformly constant rate of discharge from electric charge storing devices.

Each DM 16 includes at least one diode and each such diode presents a conductive voltage drop which must be overcome if current is to pass therethrough. These diodes are series connected in each DM 16 which consequently presents a combined conductive voltage drop thereacross, that must be overcome if electric charge is to pass therethrough. As shown in FIG. 2, forward and/or reverse biased diodes such as rectifying type 22 and zener type 24 respectively, may be included in each DM 16. Characteristically, the conductive voltage drop of diodes 22 is considerably less than for diodes 24. Also, more than one type of diode may contribute to the combined conductive voltage drop of each DM 16.

When a uniformly constant charge flow rate or current from the CSD's 12 is desired, a regulator means 26 (hereinafter RM 26) for controlling a uniformly constant voltage, is included in circuit 10 along with a charge dissipating resistance 28 (hereinafter CDR 28) to serve as the load 14, in the manner illustrated by FIG. 2. The input terminals 18 and 20 are disposed on the RM 26, along with an output having positive and negative terminals 30 and 32 respectively. CDR 28 is connected across the output terminals 30 and 32, and constant DC current flows therethrough when at least one CSD 12, such as a battery or capacitor, is connected to the discharge circuit 10. Uniformly constant current flows through the CDR 28 until being terminated when the CSD's 12 have been discharged to the combined conductive voltage drops of the DM's 16 relating thereto, because such flow can not then be sustained by the CSD's 12.

Because the voltage across the CDR 28 is maintained uniformly constant by the RM 26, the current flow therethrough is also uniformly constant. Of course, that current flow is derived from the CSD's 12 which are connected for discharge, between the DM's 16 and either input terminal 18 or 20. Consequently, if only a single CSD 12 is connected for discharge in FIG. 2, the charge flow rate therefrom will be uniformly constant throughout the duration of discharge. When more than one CSD 12 is connected for discharge in FIG. 2, they all must have substantially the same charge characteristics and the DM's 16 relating thereto must have substantially the same combined conductive voltage drop, if a uniformly constant charge flow rate is to be maintained from each CSD 12 throughout the duration of discharge. Even if the CSD's 12 should have different charge characteristics and/or the DM's 16 should have different combined conductive voltage drops, useful discharge conditions may be accomplished with the discharge circuit 10 of FIG. 2, such as the presetting of the voltage level to which each CSD 12 is discharged.

Figure 3:
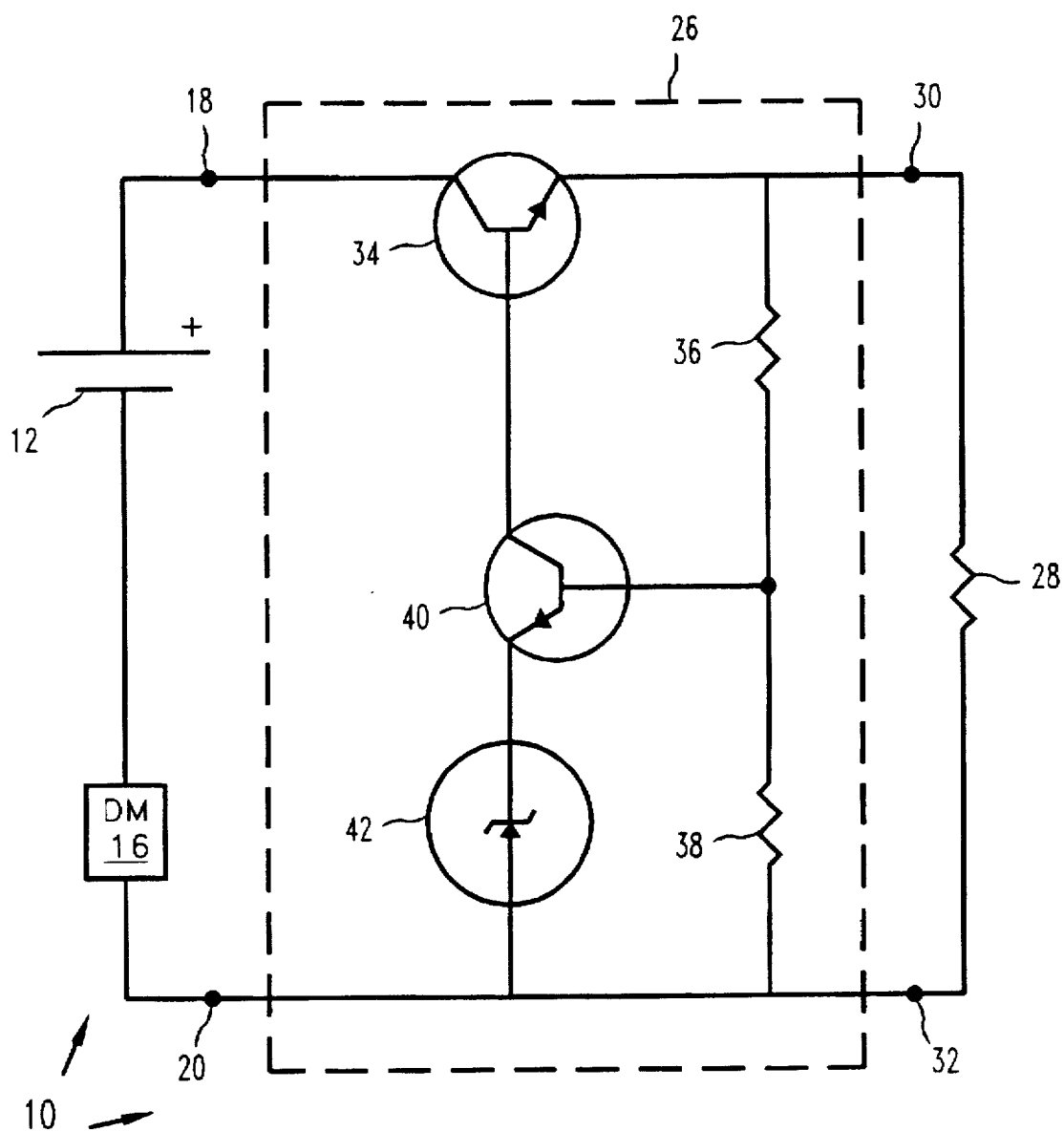
FIG. 3 is a schematic/block diagram for an embodiment of the invention similar to that of FIG. 2 and wherein a negative feedback arrangement serves as a voltage regulator.

One particular embodiment of the invention is shown in FIG. 3 wherein a negative feedback circuit is incorporated as the RM 26. In this negative feedback circuit, a first NPN transistor 34 controls current flow between the input and output of the RM 26, with the collector thereof being connected to the positive input terminal 18 and the emitter thereof being connected to the positive output terminal 30. A resistor 36 and a resistor 38 are series connected between the positive and negative output terminals 30 and 32 respectively. The common node between resistors 36 and 38 is connected to the base of a second NPN transistor 40 which has its collector connected directly to the base of transistor 34 and its emitter connected through a Zener diode 42 to the negative input terminal 20 or the negative output terminal 32 which are interconnected as a reference node, with the anode of diode 42 connected directly to the reference node. For this embodiment, a resistor is connected to serve as the CDR 28, while the discharge circuit 10 is connected to draw current from a battery charged to some initial voltage level and serving as one CSD 12.

In the FIG. 3 embodiment, Zener diode 42 fixes the bias across the emitter/base junction of transistor 40 and thereby maintains a uniformly constant voltage across the output terminals 30 and 32, even while the voltage across the input terminals 18 and 20 declines, as the battery 12 discharges. This is so because fixing that bias serves to clamp the feedback voltage at the common node between resistors 36 and 38, which in turn clamps the bias across the emitter/base junction of transistor 34. Therefore, transistor 34 uniformly passes a constant current from the battery 12, which is of sufficient magnitude to maintain that feedback voltage, as well as a constant voltage across the output terminals 30 and 32. Although the bias across the collector/base junction of transistor 34 decreases as the battery 12 discharges, the current flow through this junction remains uniformly constant until that bias can no longer support conduction thereacross. However, the bias cutoff level of that collector/base junction is very low and of no consequence relative to the combined conductive voltage drop of the DM 16, at which the discharge of the battery 12 terminates. As to the uniformly constant current, it passes from the emitter of transistor 34, through both the resistor 28 and the series connected resistors 36 and 38, with its distribution therebetween being determined by well known circuit theory.

Those skilled in the art will appreciate without any further explanation that many modifications and variations are possible within the concept of this invention, such as to utilize a conventional current limiting resistor to also control the magnitude of the discharge current. Consequently, it should be understood that all such modifications and variations fall within the scope of the following claims.

What I claim is:

1. A circuit for discharging electric charge storing devices, comprising:

a load for dissipating electric charge and including positive and negative input terminals; and diode means for terminating flow of electric charge from each charge storing device to be discharged, and each diode means includes at least one diode connected to one of the input terminals for each charge storing device to be discharged, with the diodes relating to each charge storing device being arranged in series to pass current when that charge storing device is interconnected between those diodes and the other input terminal, while the diodes relating to each charge storing device present a combined conductive voltage drop thereacross, which is preselected to establish the voltage level at which discharge terminates from the charge storing device that relates to those diodes.

2. The discharge circuit of claim 1 wherein the diodes relating to each charge storing device include at least one rectifier type diode.

3. The discharge circuit of claim 1 wherein the diodes relating to each charge storing device include at least one zener type diode.

4. The discharge circuit of claim 1 wherein the diodes relating to each charge storing device include at least one rectifier type diode and at least one zener type diode.

5. A circuit for discharging electric charge storing devices, comprising:

a load for dissipating electric charge and including a voltage regulator having positive and negative input terminals disposed thereon, along with positive and negative output terminals across which a charge dissipating resistance is connected; and diode means for terminating flow of electric charge from each charge storing device to be discharged and including at least one diode connected to one of the input terminals for each charge storing device to be discharged, with the diodes relating to each charge storing device being arranged in series to pass current when that charge storing device is interconnected between those diodes and the other input terminal, so that the diodes relating to each charge storing device present a combined conductive voltage drop thereacross, to thereby establish a preselected voltage level at which discharge terminates from the charge storing device that relates to those diodes.

6. The discharge circuit of claim 5 wherein the charge dissipating resistance is a resistor.

7. The discharge circuit of claim 5 wherein the negative input terminal and the negative output terminal are connected as a reference node and the voltage regulator includes a first NPN transistor having a collector connected to the positive input terminal, an emitter connected to the positive output terminal and a base biased through a second NPN transistor having a collector connected to the base of the first NPN transistor, an emitter connected to pass current to the reference node through a Zener diode and a base connected to a common node at which one terminal of a first resistor and one terminal of a second resistor are interconnected, with the other terminal of the first resistor being connected to the positive output terminal and the other terminal of the second resistor being connected to the reference node.

8. The discharge circuit of claim 5 wherein diode means are included for a plurality of charge storing devices.

9. The discharge circuit of claim 8 wherein each diode means includes at least one rectifier type diode.

10. The discharge circuit of claim 8 wherein each diode means includes at least one zener type diode.

11. The discharge circuit of claim 8 wherein each diode means includes at least one rectifier type diode and at least one zener type diode.

12. The discharge circuit of claim 8 wherein the charge dissipating resistance is a resistor.

13. The discharge circuit of claim 8 wherein the negative input terminal and the negative output terminal are connected as a reference node and the voltage regulator includes a first NPN transistor having a collector connected to the positive input terminal, an emitter connected to the positive output terminal and a base biased through a second NPN transistor having a collector connected to the base of the first NPN transistor, an emitter connected to pass current to the reference node through a Zener diode and a base connected to a common node at which one terminal of a first resistor and one terminal of a second resistor are interconnected, with the other terminal of the first resistor being connected to the positive output terminal and the other terminal of the second resistor being connected to the reference node.

* * * * *